United States Patent [19]

Pyatov

[11] Patent Number: 4,823,886
[45] Date of Patent: Apr. 25, 1989

[54] VACUUM-COMPRESSION TYPE PERCUSSION POWER TOOL

[76] Inventor: Vladimir Pyatov, 507 - 21 Ave., San Francisco, Calif. 94121

[21] Appl. No.: 187,925

[22] Filed: Apr. 29, 1988

[51] Int. Cl.$^4$ ............................................. B23Q 5/033
[52] U.S. Cl. ..................... 173/14; 173/116; 60/542
[58] Field of Search ................... 173/14, 116; 60/542; 92/134

[56] References Cited

U.S. PATENT DOCUMENTS

| | | | |
|---|---|---|---|
| 3,161,242 | 12/1964 | Etzkorn et al. | 173/116 X |
| 3,559,751 | 2/1971 | Yamada | 173/116 |
| 4,690,225 | 9/1987 | Tupitsyn et al. | 173/116 |

FOREIGN PATENT DOCUMENTS

| | | | |
|---|---|---|---|
| 2253174 | 5/1974 | Fed. Rep. of Germany | 173/116 |
| 51872 | 1/1942 | Netherlands | 60/542 |
| 988542 | 1/1983 | U.S.S.R. | 173/116 |

*Primary Examiner*—Donald R. Schran
*Assistant Examiner*—James L. Wolfe

[57] ABSTRACT

A vacuum-compression type percussion power tool comprising a housing (12), a cylinder (14) fixed in the housing, a piston (16) reciprocating in the cylinder (14) from a reciprocating drive mechanism such as a crank mechanism (18) driven by an electric motor, or any other suitable drive, a working tool (24) installed in the front part of the power tool, and a floating striker (34) which slides inside the cylinder (14) in a space between a tail portion (26) of working tool (24) and the lower end of the piston. The power tool has a sealed auxiliary chamber (54, 56) which is formed by means of a hollow casing (48) which surrounds the cylinder, and a space below the striker (34). The auxiliary chamber is connected to a main working chamber (38), which is formed between the piston and a striker, through a set of compensation holes (44) and a set of idle-stroke holes (46). A check valve (51) is installed in the wall of the auxiliary chamber. This check valve, which connects the auxiliary chamber with an atmospheric-pressure space (49) between the housing and the cylinder, allows flow of air in a direction only from the above-mentioned atmospheric-pressure space to the auxiliary chamber. As a result, during several cycles after starting the power tool, an additional quantity of air will be sucked into the auxiliary chamber via the check valve (51), so that after reaching established conditions, the auxiliary chamber and the main chamber will operate with an increased amount of air, and therefore with an increased pressure at the commencement of each cycle. This will increase the energy of impact.

19 Claims, 2 Drawing Sheets

VACUUM-COMPRESSION TYPE PERCUSSION POWER TOOL

FIELD OF THE INVENTION

The present invention relates to power tools, particularly to hand-held vacuum-compression type percussion tools used in the construction industry for demolition of old buildings, pavement breaking, etc.

DESCRIPTION OF PRIOR ART

The major problem experienced by the manufacturers of hand held impact and percussion power tools is to find a compromise among three contradictory requirements, i.e., to provide high energy of impact, light weight of the power tool, and reduced level of vibrations on the power tool's housing. These requirements are dictated by strict sanitary norms.

However, the three requirements mentioned are interrelated so that satisfaction of one of them results in impairment of the others. For example, an increase in the impact energy leads to an increase in weight and level of vibrations. Attempts have been made previously to solve these problems by developing new improved hand-held percussion power tools.

One vacuum compression type power tool aimed at the solution of the above problem is described in my copending U.S. patent application Ser. No. 187,554 filed on 4/28/1988. This vacuum-compression type percussion power tool comprises a housing, a cylinder fixed in the housing, a piston reciprocating in the cylinder from a reciprocating drive mechanism such as a crank mechanism driven, e.g., by an electric motor, a working tool installed in the front part of the power tool, and a floating striker which slides inside the cylinder in a space between a tail portion of the working tool and the lower end of the piston. In addition to a main working chamber, the power tool is provided with a sealed auxiliary chamber which is connected with the main chamber through compensation holes and idle-stroke holes, so that when the striker performs a working stroke toward the working tool, in addition to the force applied to the striker from air compressed in the working chamber, it is additionally assisted by the force of a vacuum developed in the auxiliary chamber. As a result, the power tool develops higher impact energy and has a reduced level of vibrations.

Although the power tool described in my above-mentioned patent application provides an increased energy of impact and has a reduced level of vibrations transmitted to the housing, this construction is effective only for relatively small power tools, e.g., with the impact energy below 40 Joules. In the case where more powerful tool is required, e.g., for demolition and pavement breaking works, the weight of the machine is increased to the extent that it becomes too heavy for manual manipulations.

OBJECTS AND ADVANTAGES OF THE INVENTION

Accordingly, it is an object of the invention to provide a hand-held percussion type power tool (hereinafter referred to simply as a percussion power tool) which develops an increased energy of impact in combination with a reduced weight. Other objects and advantages of the present invention will be understood after consideration of the drawings, ensuing description, and claims.

DRAWINGS

FIGS. 1 to 5--DESCRIPTION OF THE PERCUSSION POWER TOOL OF THE INVENTION

Figure 1:
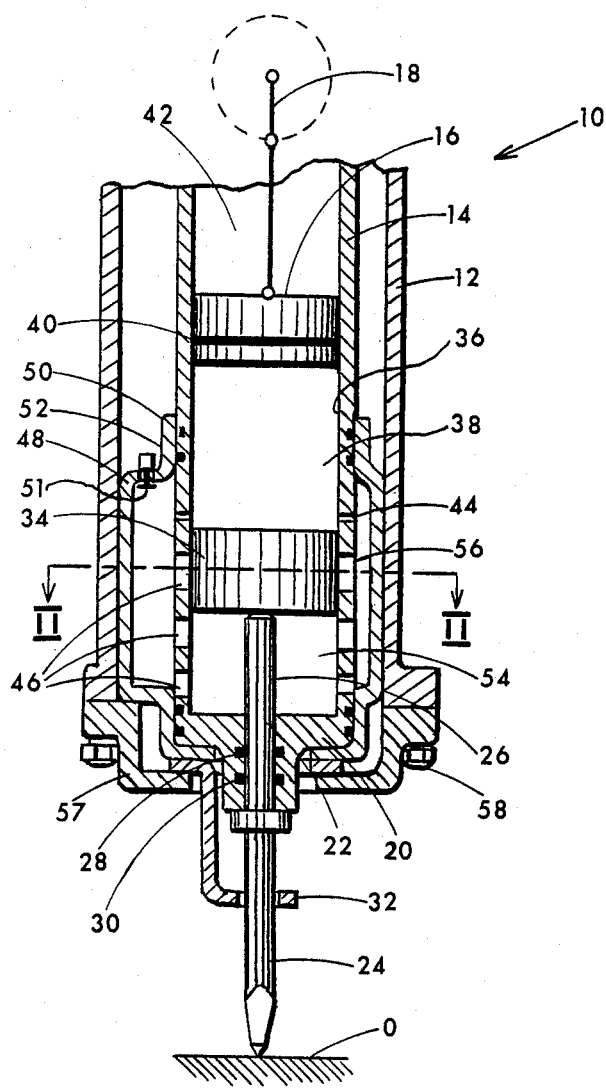
FIG. 1 is a schematic longitudinal sectional view of a percussion power tool of the invention.

A schematic longitudinal sectional view of a percussion power tool of the invention is shown in FIG. 1. The percussion tool, which in general is designated by reference numeral 10, is comprised of a housing 12 which supports a cylinder 14. Cylinder 14 contains a piston 16 which reciprocates within the cylinder and is driven through a conversion mechanism, e.g., a crank mechanism 18 located in the upper portion of housing 12. It should be understood that the conversion mechanism is shown as a crank mechanism only as an example, and that it can be any other suitable mechanism such as a wobbling mechanism, cam mechanism, etc. The conversion mechanism, in turn, can be driven from an electric motor through a reducer (not shown).

Cylinder 12 has a closed bottom wall 20 with a central guide hole 22. A tail portion 26 of a working tool, such as a chisel 24, is inserted through hole 22 into cylinder 14. Chisel 24 has a flange 25 which restricts penetration of tail portion 24 into cylinder 14. Tail portion 26 of the working tool is sealed within hole 22 by seal rings 28 and 30. Working tool 24 is restrained from falling out from the power tool by a holder 32 which is attached to housing 12 in a manner known in the art.

Located between piston 16 and tail portion 26 of the working tool is a striker 34 which is made in the form of a solid floating piston.

Piston 16, striker 34, and inner walls 36 of cylinder 14 define a main working chamber 38 of the power tool. For sealing main working chamber 38 from space 42, piston 16 has seal ring 40, which prevents leakage of air from working chamber 38 to the atmosphere.

In order to understand the subsequent description of the invention and particularly the location of various compensation ports, it is necessary to introduce the term "initial position" of the parts of the power tool. This initial position occurs when working tool 24 is pressed to an object 0 and therefore flange 25 is urged to the outer surface of bottom wall 20 of the cylinder. In FIG. 1 all the parts are shown in the initial position.

Cylinder 14 has through compensation holes 44 of small diameter drilled through the cylinder walls and located in such a place than when striker is in the initial position, holes 44 are located directly above the upper end face of striker 34.

In the lower part of cylinder 14 below holes 44, the cylinder wall has several idle-stroke holes 46 which have diameters much greater than that of compensation holes 44.

The lower part of cylinder 14 is surrounded from outside by a hollow casing 48 which embraces holes 44 and idle-stroke holes 46. Casing 48 is sealed against the outer surface of cylinder 14 by seal rings 50 and 52 located at the lower and upper ends of casing 48, respectively. A space 54 defined between the lower end face of striker 34, inner walls of cylinder 14, and bottom wall 20 of the cylinder, and a space 56 within hollow casing 48 form an auxiliary chamber which can communicate with main working chamber 38 via compensation holes 44 in the initial position (FIG. 1), or through holes 44 and idle-stroke holes 46 during the idle stroke.

A space 49, which is formed between housing 12, cylinder 14 and hollow casing 48, is connected to the atmosphere. On its portion between space 49 and space 56, hollow casing 48 has a check valve 51 which is shown in detail in FIG. 4. Check valve 51 consists of a valve housing 53, which is threaded into the wall of hollow casing 48, a valve element 55, valve seat 55a, and a spring 61. The valve admits air from atmosphere-pressure space 49 into auxiliary chamber 54, 56, but does not let air escape from the auxiliary chamber and the main working chamber.

Hollow casing 48, cylinder 14, and tool holder 32 are held in place by means of a cover 57 which is attached to housing 12 by bolts 58.

Figure 2:
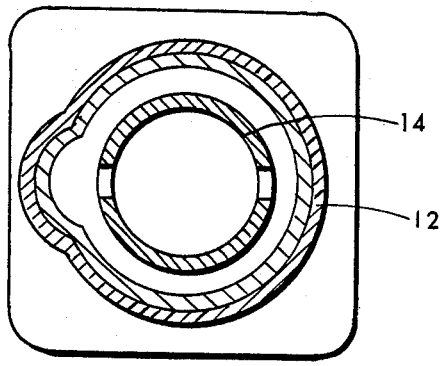
FIG. 2 is a cross-sectional view taken along lines II—II of FIG. 1.
Figure 3:
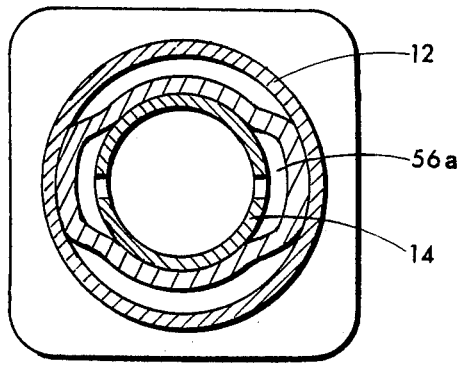
FIG. 3 is a cross-sectional view of a percussion power tool in accordance with a second embodiment of the invention.

As shown in FIG. 2, space 56 within hollow casing 48 may have an annular shape, or, as is shown in FIG. 3, space 56a may consist of separate chambers circumferentially aligned with holes 44 and 46.

Figure 5:
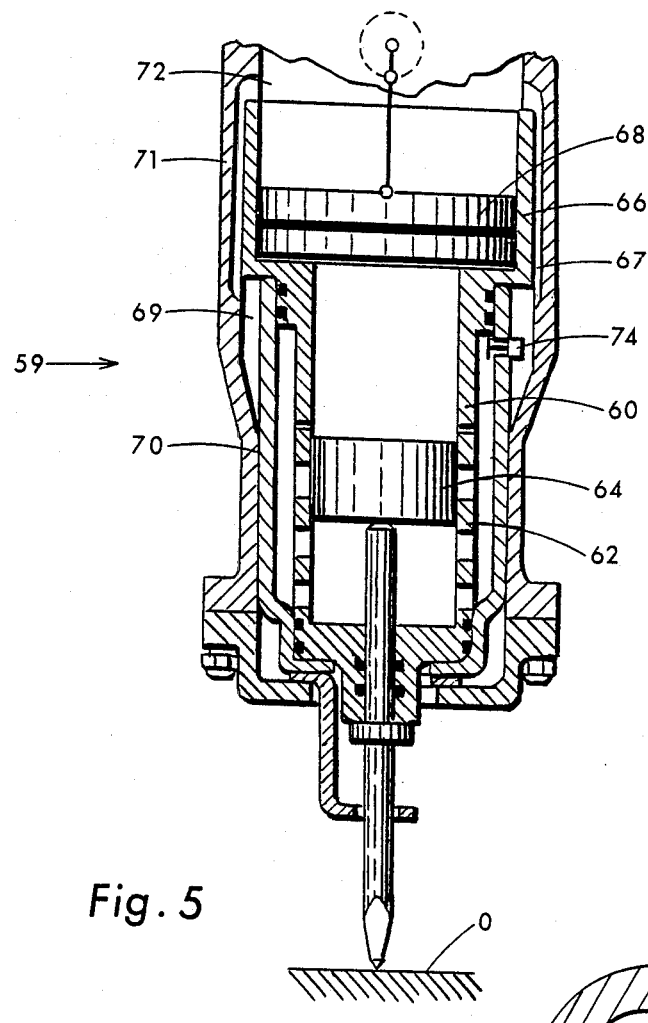
FIG. 5 is a longitudinal sectional view of a percussion power tool with a step-like cylinder incorporating the principle of the invention.
Figure 4:
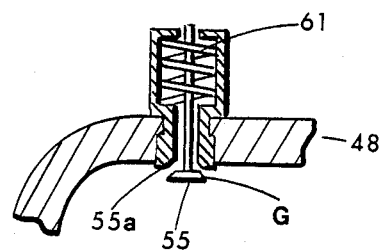
FIG. 4 is a sectional view of detail A of FIG. 1 shown on a larger scale.

In those cases where it is necessary to reduce the overall length of the power tool, an embodiment shown in FIG. 5 can be used. In this embodiment, a power tool 59 has a cylinder 60 which consists of two parts having different diameters. A small-diameter part 62 contains a striker 64, while a large-diameter part 66 of the cylinder contains a piston 68. An increase in the diameter of the piston makes it possible to reduce the length of the piston stroke, and therefore the length of the drive mechanism. The remaining parts and elements of the power tool, i.e., holes, the working tool, drive mechanism, etc., are the same as in the embodiment of FIG. 1, except for the provision of longitudinal grooves 67, which connect a space 69 formed between the outer surface of hollow casing 10 and the inner surface of a housing 71 with a space 72, i.e., with the atmosphere. In addition, the shape of hollow casing 60, which is determined by specific construction of the stepped cylinder, is formed as an extension of large-diameter part 66 of the cylinder. A check valve 74 is located between the auxiliary chamber and space 69. Housing 12 of the power tool is comprised of either aluminum casting or impact-resistant plastic molding, such as polycarbonate. Preferably, hollow casing 48 or 70 can be made from any suitable plastic, as this part does not carry a load. Cylinder 14 or 60, strikers, and working tools should be made from steel, while piston 16 and 68 can be made from steel or aluminum alloy.

Percussion power tool 10 or 59 of the invention is about 30% shorter than conventional power tools of the same power characteristic.

FIGS. 1, AND 5--OPERATION OF PERCUSSION POWER TOOL OF THE INVENTION

Operation of percussion power tool 10 will now be considered starting from the initial position which is shown in FIG. 1.

When a drive motor (not shown) is switched on, it transmits the power to crank mechanism 18 via the reducer (also not shown), so that piston 16 commences its movement in cylinder 14 in the upward direction from the lower dead center. As piston 16 moves up, the volume of main working chamber 38 is increased, and therefore a vacuum is induced in this chamber. The force of vacuum causes striker 34 to slide in cylinder 14 in upward direction. As a result, striker 34 follows piston 16 with delay. In the beginning of its stroke in the upward direction, striker 34 covers compensation holes 44, thereby sealing auxiliary chamber 54, 56 and disconnecting it from main working chamber 38, In the course of further upward motion of striker 34, the volume of auxiliary chamber 54, 56 is increased, so that a vacuum is induced in this chamber as well.

Because pressure in auxiliary chamber 54, 56 becomes lower than the atmospheric pressure in space 49, this pressure acts on check valve element, which is raised from its seat 55a, forming a gap G, so that air is sucked through this gap from space 49 into auxiliary chamber 54, 56.

Since the effective area of striker 34 is much greater than the cross-section of gap G, the vacuum will still exist in auxiliary chamber 54, 56. This vacuum of the auxiliary chamber also applies to striker 34 a force which is opposite to that applied from vacuum in main working chamber 38, However, vacuum is developed in auxiliary chamber 54, 56 with a delay with respect a vacuum in the main working chamber. Therefore, striker 34 continues to move up by inertia. Meanwhile, piston 16 reaches the upper dead center and reverses its movement, i.e., begins to move down. In other words, at this moment of the cycle, piston 16 and striker 34 move toward each other, compressing air in main working chamber 38.

In spite of the fact that air in the main working chamber is compressed, because of delay, the movement of striker 34 is continued by inertia in the upward direction, and the force of vacuum in auxiliary chamber 54, 56 is further increased. This means that the force developed by air compressed in main chamber 38 and the force of vacuum in the auxiliary chamber act in the same direction. The combined force overcomes inertia of striker 34, stops the striker, and reverses its movement. Due to the provision of auxiliary chamber 54, 56, the striker stops earlier than it would happen in the similar power tool but without the auxiliary chamber. Therefore the peak pressure in the main working chamber 38 of the tool of the invention will be much lower than in a conventional construction. Since this peak pressure is the main source of vibrations, the level of vibrations transmitted to the tool housing, and therefore to the operator, also will be reduced.

After reversing, striker 34 performs its working stroke in the downward direction with a force enhanced by the auxiliary chamber. As a result, when striker 34 comes into contact with tail portion 26 of working tool 24, it transmits to the working tool an increased impact energy.

Because the quantity of air in auxiliary chamber 54, 56 has been increased by suction of air through check valve 51, pressure in the auxiliary chamber will be increased as compared to the previous cycle. This pressure will be higher than that in main working chamber 38. At the moment of impact, compensation hole 44 will be uncovered by striker 34, so that auxiliary chamber 54, 56 will communicate with main working chamber 38, and pressures in both these chambers will be equilized. Now the power tool is ready for the next cycle which will be repeated in the same manner, but with an increased pressure. Such an increase in pressure will be continued from cycle to cycle until generation of vacuum in the auxiliary chamber will be completely terminated. Such a transitional mode of operation will continue during several cycles after starting of the power tool, and after the power tool has reached established conditions, valve 51 will not operate.

However, the quantity of air in the auxiliary and main chambers has been increased on the previous cycles, and therefore in the above-mentioned initial position of the power tool, the pressure in both chambers will be increased as well. As a result, under the established conditions, the power tool will work with an increased initial pressure. This will increase the energy of impact. Because the quantity of air in the main working chamber is increased, the peak of pressure in this chamber and thus the level of vibrations will be reduced.

When the operator raises the power tool and disconnects it from object 0, e.g., for carrying to a new working place, striker 34 and working tool 24 descend under the gravity, so that flange 25 of the tool rests on holder 32 and striker 34 rests on the tail portion of tool 24, or on bottom wall 20. In this position, the upper end face of striker 34 descends below idle stroke holes 46, and main working chamber is connected to auxiliary chamber 54,56 via a passage of a large cross-section. As a result, the pressure in both chambers remains equal, irrespective of the movement of piston, so that the striker remains at rest.

Provision of the auxiliary chamber, which operates in a vacuum mode, makes it possible to considerably reduce the length of the main working chamber without increasing the level of vibration.

The percussion power tool 59 (FIG. 4), which has stepped cylinder 60, operates exactly in the same manner as power tool 10 of FIG. 1, except that space 69 is constantly connected to atmospheric-pressure space 72, and valve 74 sucks air from space 69. An additional effect in this case is that piston 68 is protected from collision with striker 64, which may happen in conventional power tools of this type with the stepped cylinder.

Synopsis, Ramifications, Scope

Thus it has been shown that the percussion power tool of the invention is reliable in operation, lasting in service, and light in weight. It develops an increased impact energy. The power tool of the invention is shorter in length than conventional tools of this type and has a reduced level of vibrations.

The present invention has been illustrated in the form of specific embodiments shown in FIGS. 1 to 5. It is understood, however, that these embodiments have been given only as examples and that any other modifications are possible within the scope of the appended claim. For examples, the power tool was described as a hand-held tool. It can be, however, a tractor-mounted unit. The lower bottom of the cylinder, as well as the construction of the holder and connection of the cylinder to the housing, can be modified. The casing has been shown as a separate unit made from metal, or molded from plastic. It is understood, however, that this casing can be made as an integral part of the power tool housing. Compensation holes can be formed as longitudinal grooves on the inner surface of the cylinder. The drive can be obtained from a hydraulic, pneumatic motor or an internal combustion engine. The piston can even be driven by reciprocating electromagnetic drive mechanism. The principle of the invention can be incorporated into a rotary drive impact machine such as rotary hammer, perforator, etc. The check valve can be located in other places where the atmospheric-pressure air can be sucked into the auxiliary chamber. The check valve may have a different construction, e.g., it can be formed as a leaf spring. Therefore the scope of the invention should be determined not by the examples given, but by appended claims and their legal equivalents.

I claim:

1. A vacuum-compression type percussion power tool comprising:
    housing means;
    cylinder means located in said housing means and fixed therein, said cylinder means having inner and outer walls, and a closed bottom wall with an inner and outer sides, said closed bottom wall having a central opening;
    reciprocating drive means supported by said housing means on the side thereof opposite to said bottom wall;
    piston means slidingly guided in said cylinder means and driven by said reciprocating drive means;
    a working tool with a tail portion inserted into said cylinder means through said central opening, said working tool having a flange which limits insertion of said working tool into said cylinder means;
    a floating striker means having upper and lower end faces and located in said cylinder means for sliding therein between said piston means and said tail portion of said working tool inserted into said cylinder;
    a main working chamber formed in said cylinder means between said piston means and said striker means;
    a hollow casing having a wall surrounding a portion of said cylinder means and forming a space with said outer walls of said cylinder means;
    an auxiliary chamber formed by said space of said hollow casing in combination with a space between said bottom wall, said lower end face of said striker means, and said inner walls of said cylinder means;
    a space which is formed between said housing means, said cylinder means, and said hollow casing, and is connected to the atmosphere;
    a first set of through holes formed in the wall of said cylinder means above said striker means, said first set of holes connecting said main working chamber with said auxiliary chamber;
    a second set of through holes in said walls of said cylinder means between said first set of holes and said bottom wall, said second set of holes connecting said space, of said hollow casing with said space below said striker means, said holes of said second set having diameters substantially greater than those of said holes of said first set;
    one-way valve means in said wall of said hollow casing, said valve means passing air into said auxiliary chamber from said space between said housing means and cylinder means and preventing air from flowing in the opposite direction; and
    sealing means in said piston means for sealing said piston means against said inner walls of said cylinder means.

2. The vacuum-compression type power tool of claim 1 wherein in an initial position of said power tool, which is obtained when said working tool rests on an object, said flange of said working tool is urged to said outer side of said bottom wall, and said piston means is in its lower dead center, and said upper end face of said striker means is located below said first set of holes.

3. The vacuum-compression type power tool of claim 2, wherein in said initial position, said upper end face of said striker means is located directly below said first set of holes, said holes of said second set being arranged in series in the axial direction of said cylinder means from said first set of holes to said bottom wall.

4. The vacuum-compression type power tool of claim 2, wherein in said initial position, said upper end face of said striker means partially overlaps said first set of holes.

5. The vacuum-compression type power tool of claim 1 wherein said valve means comprise a check valve.

6. The vacuum-compression type power tool of claim 1, wherein said central opening of said bottom wall has first sealing means for sealing said tail portion of said working tool in said central opening, connection of said hollow casing to said cylinder means having second sealing means for sealing said connection.

7. The vacuum-compression type power tool of claim 1 wherein said space formed in said hollow casing and surrounding said outer walls of said cylinder means comprises a single chamber.

8. The vacuum-compression type power tool of claim 1 wherein said space formed in said hollow casing and surrounding said outer walls of said cylinder means comprises several separate chambers, each of which is aligned with said first and second sets of holes.

9. The vacuum-compression type power tool of claim 1 wherein said hollow casing is molded from a heat- and impact-resistant plastic.

10. A vacuum-compression type percussion power tool comprising:
    a housing;
    a cylinder located in said housing and fixed therein, said cylinder having inner and outer walls, and a closed bottom wall with an inner and outer sides, said closed bottom wall having a central opening;
    a reciprocating drive mechanism supported by said housing on the side thereof opposite to said bottom wall;
    a piston having end faces and a cylindrical peripheral surface slidingly guided in said cylinder, said piston being driven by said reciprocating drive mechanism;
    at least one sealing ring in said peripheral surface of said piston for sealing said piston against said inner wall of said cylinder;
    a working tool with a tail portion inserted into said cylinder through said central opening, said working tool having a flange which limits insertion of said working tool into said cylinder;
    a floating striker having upper and lower end faces and located in said cylinder for sliding therein between said piston and said tail portion of said working tool inserted into said cylinder;
    a main working chamber formed in said cylinder between said piston and said striker;
    a hollow casing with a wall surrounding a portion of said cylinder and forming a space with said outer walls of said cylinder;
    a space which is formed between said cylinder, housing and hollow casing and which is connected to the atmosphere;
    an auxiliary chamber formed by said space of said hollow casing in combination with a space between said bottom wall, said lower end face of said striker, and said inner walls of said cylinder;
    a first set of through hollows formed in the wall of said cylinder above said striker, said first set of holes connecting said main working chamber with said auxiliary chamber;
    a second set of through holes in said walls of said cylinder between said first set of holes and said bottom wall, said second set of holes connecting said space of said hollow casing with said space below said striker, said holes of said second set having diameters substantially greater than those of said holes of said first set;
    a check valve in said wall of said hollow casing, said check valve passing air from said space between said housing, cylinder and the hollow casing, and preventing flow of air in the opposite direction;
    first sealing means between said tail portion of said working tool and said central opening of said bottom wall; and
    second sealing means between said hollow casing and said cylinder, said first and said second sealing means seal said auxiliary chamber.

11. The vacuum-compression type power tool of claim 10 wherein in an initial position of said power tool, which is obtained when said working tool rests on an object, said flange of said working tool is urged to said outer side of said bottom wall, and said piston is in its lower dead center, and said upper end face of said striker is located below said first set of holes.

12. The vacuum-compression type power tool of claim 11, wherein in said initial position, said upper end face of said striker is located directly below said first set of holes, said holes of said second set being arranged in series in the axial direction of said cylinder from said first set of holes to said bottom wall.

13. The vacuum-compression type power tool of claim 11, wherein in said initial position, said upper end face of said striker means partially overlaps said first set of holes.

14. The vacuum-compression type power tool of claim 10 wherein said space formed in said hollow casing and surrounding said outer walls of said cylinder comprises a single chamber.

15. The vacuum-compression type power tool of claim 10 wherein said space formed in said hollow casing and surrounding said outer walls of said cylinder comprises several separate chambers each of which is aligned with said first and second sets of holes.

16. The vacuum-compression type power tool of claim 10 wherein said hollows casing is molded from heat- and impact-resistant plastic.

17. The vacuum-compression type power tool of claim 10 wherein said reciprocating drive mechanism is a crank mechanism.

18. The vacuum-compression type power tool of Clam 10 wherein said cylinder is a stepped cylinder having a larger diameter portion which contains said piston, and a smaller-diameter portion which contains said striker.

19. The vacuum-compression type power tool of claim 10 further provided with means for holding said cylinder, hollow casing, and working tool in place, said holding means comprising a working tool holder and a cover which is attached to said housing from the side below said bottom wall.

* * * * *